May 14, 1957  G. G. WENTWORTH  2,791,859
FISHING LURE
Filed May 2, 1955

Gerald G. Wentworth
INVENTOR.

United States Patent Office 2,791,859
Patented May 14, 1957

2,791,859

FISHING LURE

Gerald G. Wentworth, Houston, Tex.

Application May 2, 1955, Serial No. 505,253

4 Claims. (Cl. 43—42.02)

This invention comprises novel and useful improvements in a fishing lure, and more specifically relates to an animated fishing lure adapted to permit the angler to control the lure in close imitation of the movements of a shrimp or other bait lure.

The principal object of this invention is to provide a fish lure which will, by the relative motion of its parts and its movement in the water, closely simulate the action of the natural prey of fish.

A further object of the invention is to provide an animated lure in conformity with the preceding object wherein the motion of the lure in the water as well as the relative motion of the parts of the lure may be easily controlled in an improved manner by the angler.

Yet another object of the invention is to provide a fish lure in conformity with the preceding objects wherein a single fishing line attached to the lure may be employed both to control the movement of the lure in the water as well as to control the relative motions of the articulated components of the lure.

A still further object of the invention is to provide an improved fish lure in which the manipulation of the fishing line by the angler may be utilized to control the speed of movement of the lure in the water, to control the character of this motion as by imparting a skipping action thereto, and to also cause relative movement of the different components of the lure.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
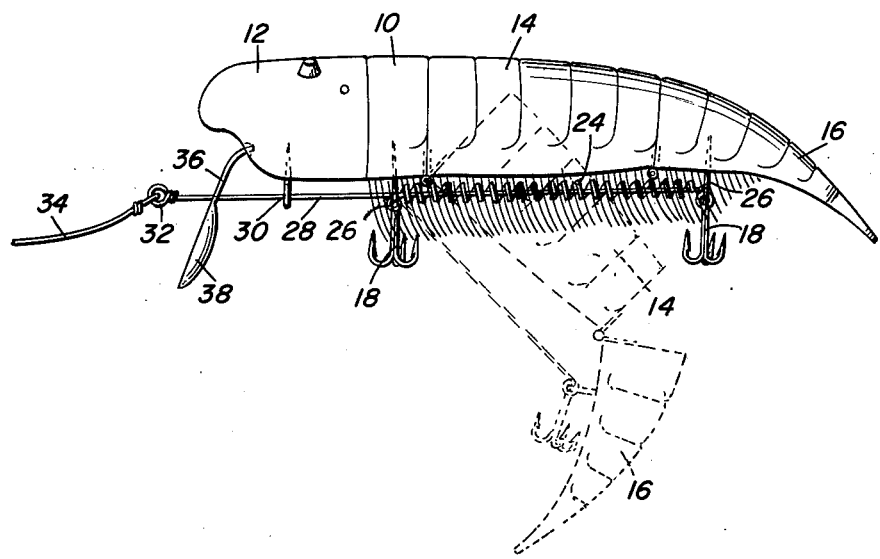
Figure 1 is an elevational view showing, by way of illustration only, one embodiment of fishing lure in accordance with the principles of this invention, the lure being shown in its normal position in full lines, and there being shown in dotted lines the position of the lure components as manipulated by the angler.
Figure 2:
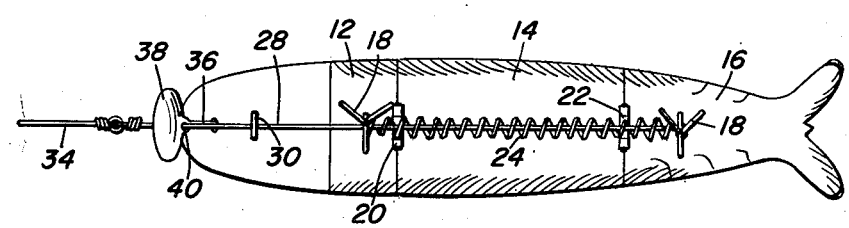
Figure 2 is a bottom plan view of the embodiment of Figure 1.

Referring to the embodiment of Figures 1–4, it will be seen that the animated lure in accordance with this invention consists of a body indicated generally by the numeral 10, and which body may be constructed of any suitable material and preferably is adapted to simulate the natural prey of a fish, as a shrimp or the like. The body includes a front portion 12, a middle portion 14 and a tail portion 16, conventional hooks 18 being secured to one or more of these body sections in accordance with conventional practice.

It will be observed that the adjacent portions of the sections 12 and 14 are pivotally connected together as by a hinge 20 disposed at the bottom portions of these sections, while the sections 14 and 16 in turn are pivotally connected together by a hinge 22. By means of this construction, the sections may be articulated downwardly, as shown in dotted lines in Figure 1, although the body is normally yieldingly and resiliently retained with its sections in longitudinal alignment upon a common longitudinal axis by means of a resilient element in the form of a compression spring 24 which is disposed beneath the body and is confined at its extremities by the eye screws 26 by means of which the hooks 18 are attached to the sections of the lure.

A member for controlling the pivoting motion of the sections of the body of the lure is provided, the same consisting of a rod, wire or cable 28 which extends through an eye screw 30 depending from the lower surface of the front section 12 to constitute a guide for the actuating member, and also through the eye screws 26 and through the compression spring 24. At its front end, this actuating member is provided with an eye 32 to which the fishing line 34 is secured.

Secured to and depending from the lower portion of the front section 12 is the shank 36 of a spoon 38. An aperture 40 is provided in the spoon 38 or shank 36 for passage of the actuating member 28 therethrough.

At this point, it should be observed that in some instances, the line 34 may constitute the actuating member and may itself extend through the aperture in the spoon member, through the guide 30 and through the screw eyes 26 and the spring 24.

Figure 3:
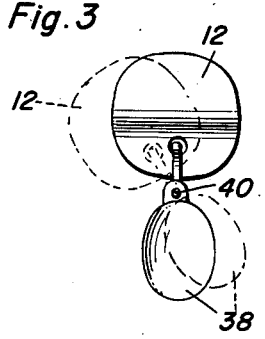
Figures 3 and 4 are somewhat diagrammatic front elevational views of the lure of Figure 1 and illustrating the manner in which the spoon may be manipulated to impart a skipping, yawing movement to the lure.
Figure 4:
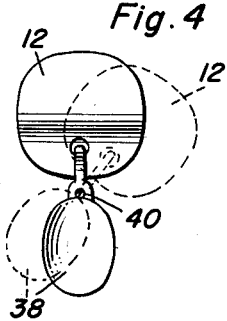

The operation of this embodiment of the invention is as follows. The angler may manipulate the lure by the line 34 in the usual manner. As the lure is moved through the water by a very slight pressure upon the line 34, the action of the spoon causes a skipping or yawing motion of the lure in accordance with conventional practice, while the passage of the actuating member or of the line through the aperture in the spoon will cause the lure to roll to one side or the other, as shown in Figures 3 and 4. This rolling motion, in conjunction with the skipping action, renders the lure more effective in enticing fish.

Still further, it will be apparent that while the normal action of the spring 24 is to maintain the sections of the lure in a substantially rigid longitudinal alignment, it is evident that varying tension upon the line, as by a sudden pull or tug on the same by the angler will cause the sections to flex or pivot with respect to each other, as shown in dotted lines in Figure 1. The extent of this flexure or pivoting movement will, of course, depend upon the relative force of the tensioning of the line compared to the resilient resistance of the spring 24. In order to enable this tensioning action to be effective in flexing the sections of the body of the lure, it will be observed that the actuating member 28 or the line 34 if the latter is employed as the actuating member, is displaced from the bottom of the lure body by means of the position of the eyes of the screws 26, so that the line of action of the actuating member is offset from the axis of the hinges 20 and 22.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing lure comprising a body having longitudinally and horizontally disposed front, middle and tail sections the adjacent ends of said sections having plane-abutting surfaces, hinge means disposed between and pivotally connecting the sections at their lower portions for vertically swinging movement, means resiliently urging said sections into normal longitudinal alignment upon a common axis with said surfaces in abutting engagement, a hook carried beneath and by at least one of said sections, and a line operatively connected to and spaced from at least two of said sections at the bottom portions thereof and spaced laterally from the pivotal connections of the sections whereby varying tension upon the line will effect varying pivotal movement of said sections, said resilient means comprising a compression spring disposed on the bottom side of said lure and terminally connected to two of said sections, the ends of the spring being spaced from the sections.

2. A fishing lure comprising a body having longitudinally and horizontally disposed front, middle and tail sections the adjacent ends of said sections having plane abutting surfaces, hinge means disposed between and pivotally connecting the sections at their lower portions for vertically swinging movement, means resiliently urging said sections into normal longitudinal alignment upon a common axis with said surfaces in abutting engagement, a hook carried beneath and by at least one of said sections, and a line operatively connected to and spaced from at least two of said sections at the bottom portions thereof and spaced laterally from the pivotal connections of the sections whereby varying tension upon the line will effect varying pivotal movement of said sections, said resilient means comprising a compression spring disposed on the bottom side of said lure and terminally connected to two of said sections, the ends of the spring being spaced from the sections, said line having a rod extending through said spring.

3. A fishing lure comprising a body having longitudinally and horizontally disposed front, middle and tail sections the adjacent ends of said sections having plane abutting surfaces, hinge means disposed between and pivotally connecting the sections at their lower portions for vertical swinging movement, means resiliently urging said sections into normal longitudinal alignment upon a common axis with said surfaces in abutting engagement, a hook carried beneath and by at least one of said sections, a line operatively connected to and spaced from at least two of said sections at the bottom portions thereof and spaced laterally from the pivotal connections of the sections whereby varying tensions upon the line will effect varying pivotal movement of said sections, and an eye screw secured dependingly to the bottom surface of one section of the lure, said resilient means comprising a compression spring operatively connected and abuttingly engaged at one end to the eye screw and being operatively connected at its other end to another of said sections.

4. A fishing lure comprising a body having longitudinally and horizontally disposed front, middle and tail sections the adjacent ends of said sections having plane abutting surfaces, hinge means disposed between and pivotally connecting the sections at their lower portions for vertical swinging movement, means resiliently urging said sections into normal longitudinal alignment upon a common axis with said surfaces in abutting engagement, a hook carried beneath and by at least one of said sections, a line operatively connected to and spaced from at least two of said sections at the bottom portions thereof and spaced laterally from the pivotal connections of the sections whereby varying tensions upon the line will effect varying pivotal movement of said sections, an eye screw secured dependingly to the bottom surface of one section of the lure, said resilient means comprising a compression spring abutting at one end the eye screw and at its other end being operatively connected to another of said sections, a rod slidably disposed through the eye of the eye screw and within said spring, and means fastening an end of said rod to another of said sections, said line being secured to said rod.

References Cited in the file of this patent

UNITED STATES PATENTS

| | | |
|---|---|---|
| 1,545,683 | Nowak | July 14, 1925 |
| 1,840,273 | Lang | Jan. 5, 1932 |
| 1,854,024 | Farley | Apr. 12, 1932 |
| 2,221,381 | Hosmer | Nov. 12, 1940 |
| 2,290,433 | Jeffers | July 21, 1942 |
| 2,437,523 | Hahn | Mar. 9, 1948 |
| 2,593,461 | Jones | Apr. 22, 1952 |
| 2,663,964 | Martin | Dec. 29, 1953 |
| 2,758,409 | Eslinger | Aug. 14, 1956 |

FOREIGN PATENTS

| | | |
|---|---|---|
| 618,400 | Great Britain | Feb. 21, 1949 |